United States Patent
Yagasaki et al.

(10) Patent No.: US 9,772,005 B2
(45) Date of Patent: Sep. 26, 2017

(54) CONTINUOUSLY VARIABLE TRANSMISSION METAL ELEMENT

(71) Applicant: HONDA MOTOR CO., LTD., Tokyo (JP)

(72) Inventors: Toru Yagasaki, Wako (JP); Soichiro Sumida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 15/002,398

(22) Filed: Jan. 21, 2016

(65) Prior Publication Data

US 2016/0281819 A1    Sep. 29, 2016

(30) Foreign Application Priority Data

Mar. 24, 2015    (JP) ................................. 2015-061300

(51) Int. Cl.
| | |
|---|---|
| *F16G 1/21* | (2006.01) |
| *F16G 1/22* | (2006.01) |
| *F16G 5/16* | (2006.01) |
| *F16G 1/20* | (2006.01) |

(52) U.S. Cl.
CPC ...................................... *F16G 5/16* (2013.01)

(58) Field of Classification Search
CPC . F16G 5/16; F16G 5/163; B21D 53/14; F16H 9/125; Y10T 29/49826
USPC .................................................. 474/242, 272
See application file for complete search history.

(56) References Cited

U.S. PATENT DOCUMENTS

| | | | | |
|---|---|---|---|---|
| 4,457,742 A | * | 7/1984 | Hattori ...................... | F16G 5/16 474/201 |
| 5,004,450 A | * | 4/1991 | Ide ........................... | F16G 5/16 474/242 |
| 5,346,440 A | * | 9/1994 | Smeets ..................... | F16G 5/16 474/242 |
| 6,074,317 A | * | 6/2000 | Kobayashi ............... | F16G 5/16 474/201 |
| 6,090,004 A | * | 7/2000 | Kanehara ................. | F16G 5/16 474/201 |
| 6,123,637 A | * | 9/2000 | Yagasaki .................. | F16G 5/16 474/242 |

(Continued)

FOREIGN PATENT DOCUMENTS

JP           4132820 B2       8/2008

*Primary Examiner* — Henry Liu
(74) *Attorney, Agent, or Firm* — Mori & Ward, LLP (57) ABSTRACT

A continuously variable transmission metal element includes a first ring slot, a second ring slot, a neck portion, an ear portion, and a body portion. The body portion includes an inclined surface. A plate thickness of the continuously variable transmission metal element in a longitudinal direction at an inner end of the inclined surface in a radial direction is larger than a distance between a first metal mold molding surface of a first metal mold and a second metal mold molding surface of a second metal mold in the longitudinal direction at a position corresponding to the inner end of the inclined surface. The first metal mold and the second metal mold constitute a metal mold to press a roughly formed metal element material between the first metal mold molding surface and the second metal mold molding surface so as to provide the continuously variable transmission metal element.

7 Claims, 9 Drawing Sheets

(56) References Cited

U.S. PATENT DOCUMENTS

| | | | | |
|---|---|---|---|---|
| 6,332,854 B1* | 12/2001 | Kanokogi | F16G 5/16 | 474/201 |
| 6,336,884 B1* | 1/2002 | Wakui | F16G 5/16 | 474/201 |
| 6,432,012 B1* | 8/2002 | Kanehara | F16G 5/16 | 474/242 |
| 6,440,025 B1* | 8/2002 | Ohnuki | F16G 5/16 | 474/242 |
| 6,565,469 B1* | 5/2003 | Aoyama | F16G 5/163 | 474/240 |
| 6,578,249 B2* | 6/2003 | Fujioka | F16G 5/16 | 29/428 |
| 6,599,212 B2* | 7/2003 | Kanokogi | F16G 5/16 | 474/201 |
| 6,626,782 B1* | 9/2003 | Ohsono | B21D 53/14 | 474/201 |
| 6,626,783 B1* | 9/2003 | Shimada | F16G 5/16 | 474/201 |
| 6,645,104 B2* | 11/2003 | Suzuki | F16G 5/16 | 474/201 |
| 6,652,403 B2* | 11/2003 | Drees | F16H 9/125 | 474/201 |
| 6,672,984 B2* | 1/2004 | Yagasaki | F16G 5/16 | 474/201 |
| 6,755,760 B2* | 6/2004 | Akagi | F16G 5/16 | 474/201 |
| 6,843,743 B2* | 1/2005 | Aoyama | F16G 5/16 | 474/242 |
| 6,857,980 B2* | 2/2005 | van Liempd | F16G 5/16 | 474/242 |
| 6,875,143 B2* | 4/2005 | Brandsma | F16G 5/16 | 474/201 |
| 6,896,633 B2* | 5/2005 | Kanehara | F16G 5/16 | 474/201 |
| 6,951,124 B2* | 10/2005 | Kanamaru | F16G 5/16 | 474/242 |
| 7,077,775 B2* | 7/2006 | Shiba | F16G 5/16 | 474/201 |
| 7,169,071 B2* | 1/2007 | Miura | F16G 5/16 | 474/242 |
| 7,261,656 B2* | 8/2007 | Sakai | F16G 5/163 | 474/201 |
| 7,963,873 B2* | 6/2011 | Kobayashi | F16G 5/16 | 474/201 |
| 8,272,984 B2* | 9/2012 | Kato | F16G 5/16 | 474/242 |
| 8,870,695 B2* | 10/2014 | Nishimi | F16G 5/16 | 474/242 |
| 2001/0051554 A1* | 12/2001 | Kanehara | F16G 5/16 | 474/242 |
| 2002/0025871 A1* | 2/2002 | Fujioka | F16G 5/16 | 474/242 |
| 2002/0025872 A1* | 2/2002 | Shiba | F16G 5/16 | 474/242 |
| 2002/0052261 A1* | 5/2002 | Kanokogi | F16G 5/16 | 474/242 |
| 2002/0123406 A1* | 9/2002 | Brandsma | F16H 57/0489 | 474/242 |
| 2002/0128103 A1* | 9/2002 | Brandsma | F16G 5/16 | 474/242 |
| 2002/0137585 A1* | 9/2002 | Smeets | F16G 5/163 | 474/242 |
| 2002/0138986 A1* | 10/2002 | Wakui | B21D 53/14 | 29/892 |
| 2002/0160872 A1* | 10/2002 | Kanokogi | F16G 5/16 | 474/242 |
| 2002/0187868 A1* | 12/2002 | Liempd | F16G 5/16 | 474/242 |
| 2003/0004024 A1* | 1/2003 | Van Dijnsen | F16G 5/16 | 474/242 |
| 2003/0032513 A1* | 2/2003 | Aoyama | F16G 5/16 | 474/242 |
| 2003/0050142 A1* | 3/2003 | Akagi | F16G 5/16 | 474/242 |
| 2003/0162616 A1* | 8/2003 | Miura | F16G 5/16 | 474/242 |
| 2004/0048707 A1* | 3/2004 | Suzuki | F16G 5/16 | 474/242 |
| 2004/0053723 A1* | 3/2004 | Smeets | F16G 5/163 | 474/242 |
| 2004/0106485 A1* | 6/2004 | Maria Prinsen | F16G 5/16 | 474/242 |
| 2004/0152550 A1* | 8/2004 | Van Der Meer | F16G 5/16 | 474/242 |
| 2004/0162173 A1* | 8/2004 | Yoshida | F16G 5/16 | 474/242 |
| 2004/0176202 A1* | 9/2004 | Sakai | F16G 5/163 | 474/242 |
| 2006/0079366 A1* | 4/2006 | Kanehara | F16G 5/16 | 474/242 |
| 2006/0135306 A1* | 6/2006 | Hattori | F16G 5/16 | 474/242 |
| 2008/0305906 A1* | 12/2008 | Kobayashi | F16G 5/16 | 474/242 |
| 2009/0111633 A1* | 4/2009 | Yagasaki | F16G 5/16 | 474/242 |
| 2010/0029427 A1* | 2/2010 | Van Der Meer | F16G 5/16 | 474/242 |
| 2010/0227721 A1* | 9/2010 | Kato | F16G 5/16 | 474/242 |
| 2012/0277048 A1* | 11/2012 | Van Der Sluis | F16G 5/16 | 474/242 |
| 2014/0106919 A1* | 4/2014 | Harima | F16G 5/16 | 474/242 |
| 2014/0221141 A1* | 8/2014 | Van Der Sluis | F16G 5/16 | 474/242 |

* cited by examiner

BACKGROUND ART

CONTINUOUSLY VARIABLE TRANSMISSION METAL ELEMENT

CROSS-REFERENCE TO RELATED APPLICATIONS

The present application claims priority under 35 U.S.C. §119 to Japanese Patent Application No. 2015-061300, filed Mar. 24, 2015, entitled "Continuously Variable Transmission Metal Element." The contents of this application are incorporated herein by reference in their entirety.

BACKGROUND

1. Field

The present disclosure relates to a continuously variable transmission metal element.

2. Description of the Related Art

From Japanese Patent No. 4132820 there is known a method of manufacturing a metal element for use in a belt-type continuously variable transmission metal belt by which a metal element material that has been roughly formed to a shape close to a finished metal element is subjected to press and finish forming using a metal mold consisting of a main punch and a counter punch, thereby improving the accuracy of a shape of a rocking edge of the metal element while ensuring the durability of the metal mold.

SUMMARY

According to one aspect of the present invention, a continuously variable transmission metal element formed by subjecting a roughly formed metal element material to press and finish forming using a metal mold includes a pair of ring slots, a neck portion, an ear portion, and a body portion. A pair of metal rings are fitted into the pair of ring slots. The neck portion is located between the pair of ring slots. The ear portion connects to an outer side in a radial direction of the neck portion. The body portion connects to an inner side in the radial direction of the neck portion and has saddle surfaces supporting circumferential surfaces of the metal rings and has an inclined surface on a front face thereof via a rocking edge extending in a lateral direction. The inclined surface has its inner side in the radial direction inclined rearward. A plate thickness in a longitudinal direction of the metal element subjected to the finish forming at an inner end in the radial direction of the inclined surface is larger than a clearance in the longitudinal direction of a molding surface of the metal mold corresponding to the inner end in the radial direction of the inclined surface.

According to another aspect of the present invention, a continuously variable transmission metal element includes a first ring slot, a second ring slot, a neck portion, an ear portion, and a body portion. A first metal ring is to be fitted into the first ring slot. A second metal ring is to be fitted into the second ring slot. The neck portion is located between the first ring slot and the second ring slot. The ear portion is connected to an outer side of the neck portion in a radial direction. The body portion is connected to an inner side of the neck portion in the radial direction. The body portion includes a first saddle surface, a second saddle surface, a rocking edge, and an inclined surface. The first saddle surface is to support a circumferential surface of the first metal ring. The second saddle surface is to support a circumferential surface of the second metal ring. The rocking edge extends in a lateral direction perpendicular to the radial direction. The inclined surface is provided on a front face of the body portion and inclined rearward in a longitudinal direction perpendicular to the lateral direction from the rocking edge toward an inner side of the body portion in the radial direction. A plate thickness of the continuously variable transmission metal element in the longitudinal direction at an inner end of the inclined surface in the radial direction is larger than a distance between a first metal mold molding surface of a first metal mold and a second metal mold molding surface of a second metal mold in the longitudinal direction at a position corresponding to the inner end of the inclined surface. The first metal mold and the second metal mold constitute a metal mold to press a roughly formed metal element material between the first metal mold molding surface and the second metal mold molding surface so as to provide the continuously variable transmission metal element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment of the present application will be described below with reference to FIGS. 1 through 9B.

Figure 1:
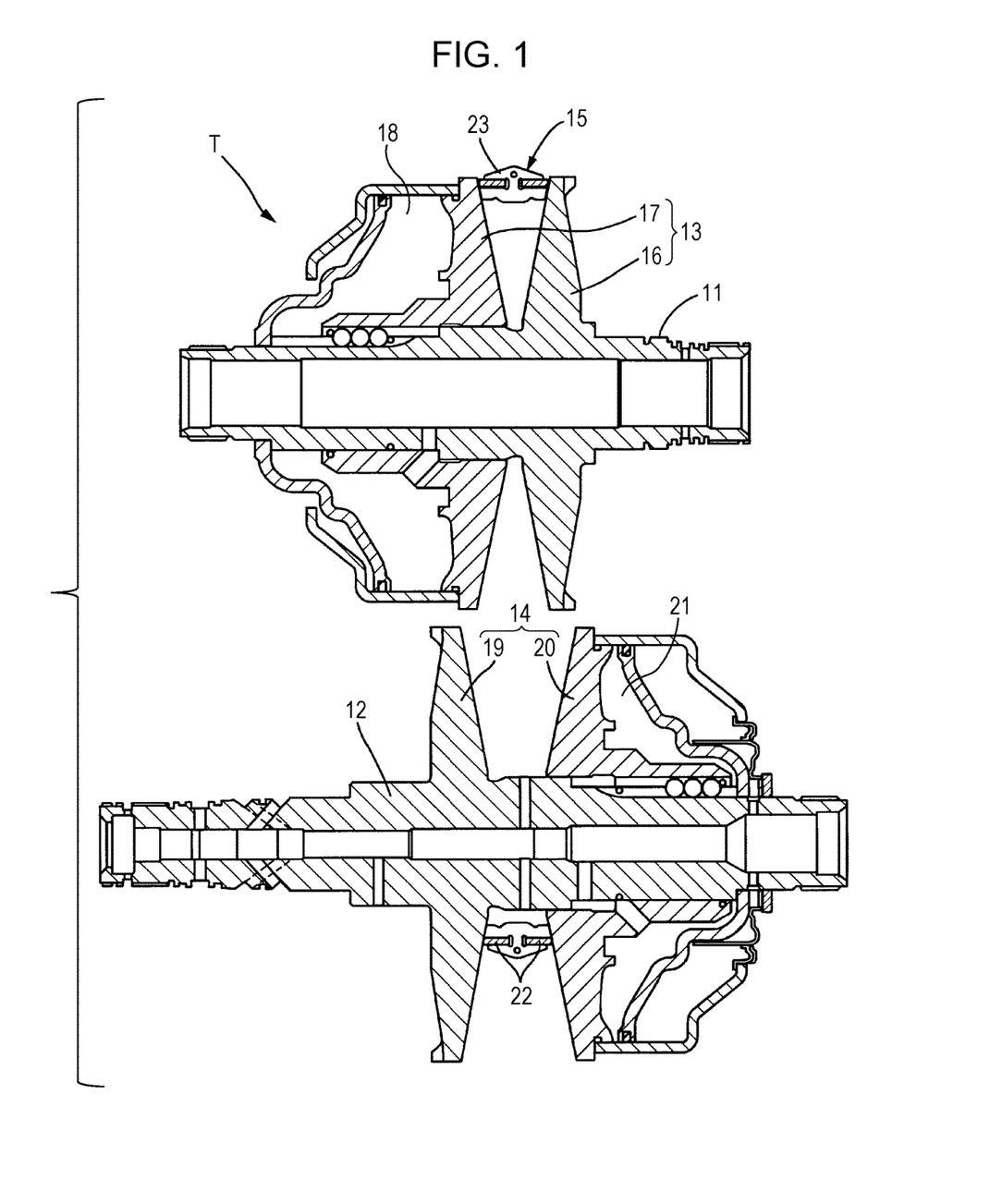
FIG. 1 is a diagram showing an overall structure of a belt-type continuously variable transmission (according to an embodiment of the present application).

FIG. 1 is a schematic diagram showing a structure of a belt-type continuously variable transmission T mounted on a motor vehicle. The belt-type continuously variable transmission T has a drive shaft 11 connected to an engine and a driven shaft 12 connected to a drive wheel. An endless metal belt 15 is wound around a drive pulley 13 provided on the drive shaft 11 and a driven pulley 14 provided on the driven shaft 12. The drive pulley 13 has a fixed pulley half 16 securely installed on the drive shaft 11 and a movable pulley half 17 that is able to move toward and away from the fixed pulley half 16. The movable pulley half 17 is biased toward the fixed pulley half 16 by means of hydraulic pressure exerted on an oil chamber 18. The driven pulley 14 has a fixed pulley half 19 securely installed on the driven shaft 12 and a movable pulley half 20 that is able to move toward and away from the fixed pulley half 19. The movable pulley half 20 is biased toward the fixed pulley half 19 by means of hydraulic pressure exerted on an oil chamber 21.

Figure 2:
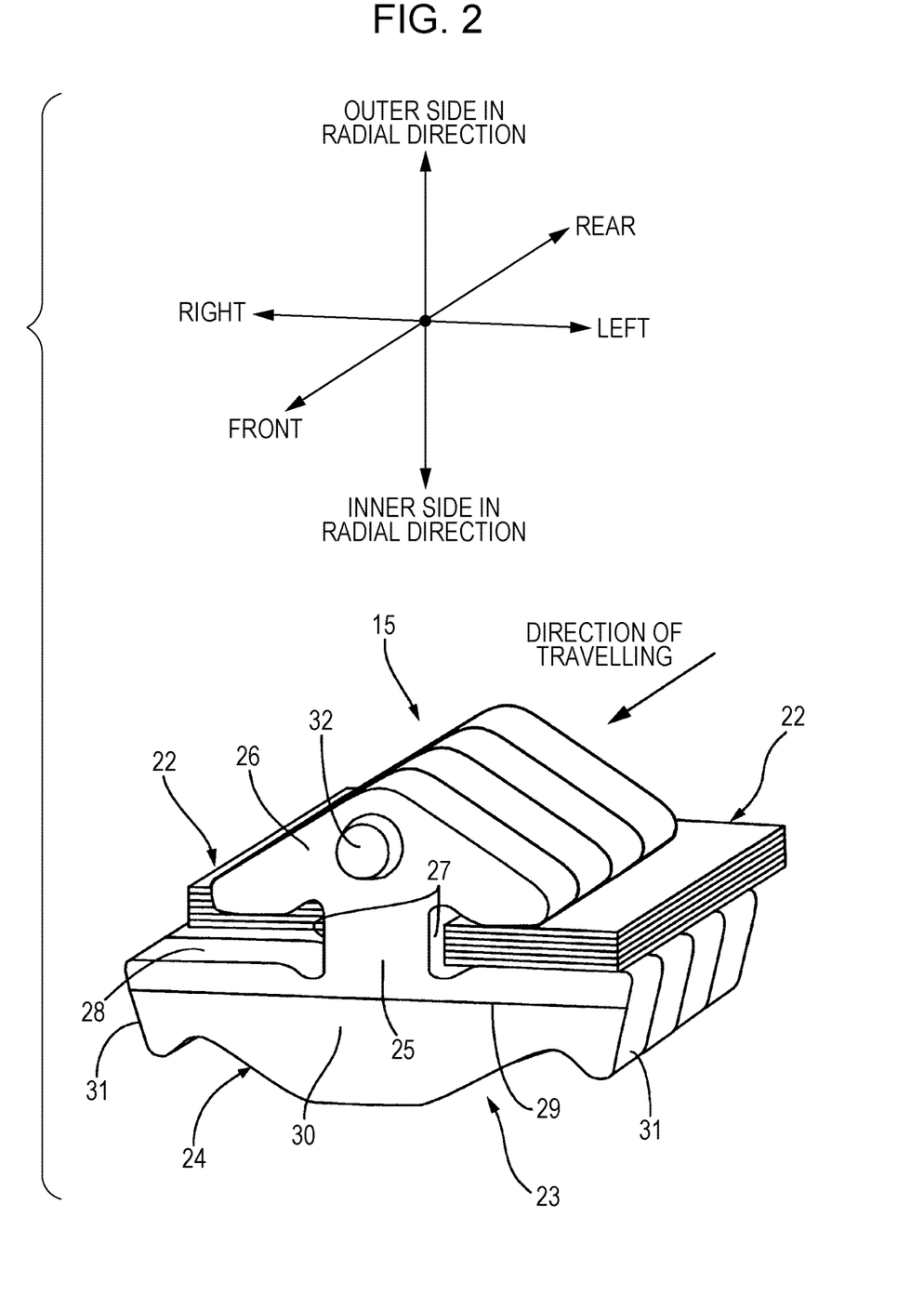
FIG. 2 is a perspective view of part of a metal belt (according to the embodiment).
Figure 3:
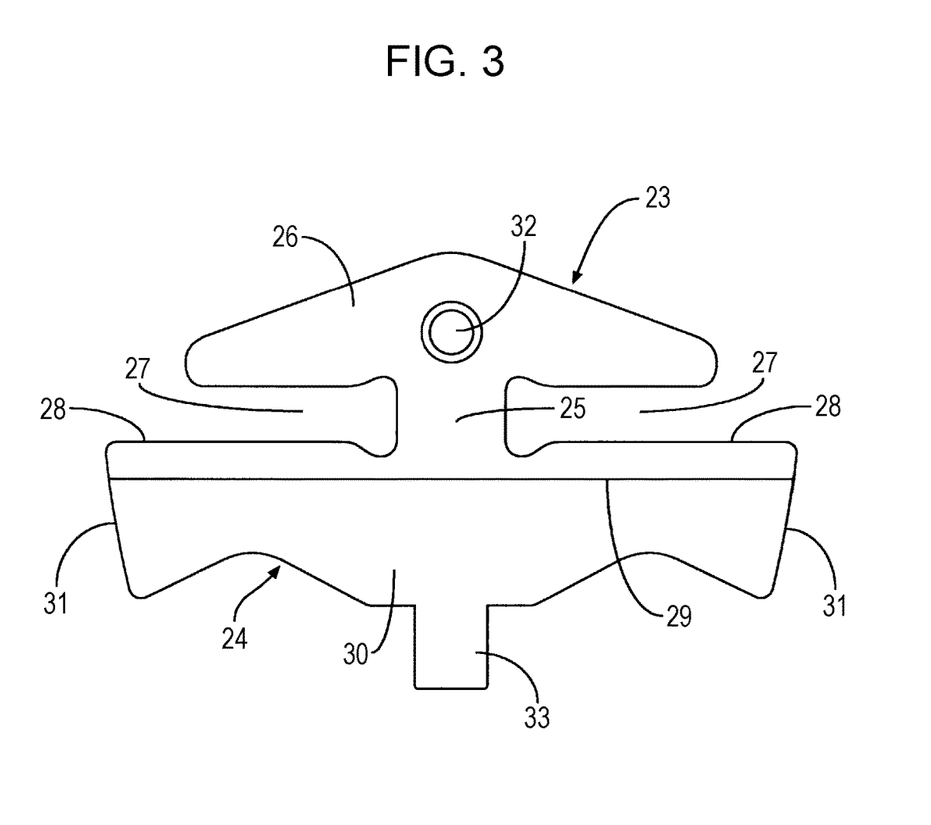
FIG. 3 is a diagram showing a metal element provided with an excess portion (according to the embodiment).

As shown in FIGS. 2 and 3, the metal belt 15 consists of a number of metal elements 23 supported on a pair of right and left metal rings 22. In this description, the direction in which the metal belt 15 travels is defined as "forward" in a longitudinal direction. In addition, while the metal belt 15 is wound around the drive pulley 13 and the driven pulley 14, an outer circumferential side of the drive pulley 13 and the driven pulley 14 is defined as an outer side in a radial direction. Furthermore, a direction perpendicular to the longitudinal direction and the radial direction is defined as a lateral direction.

The metal elements 23 formed by subjecting a metal plate to punching and press forming each have a body portion 24 extending in the lateral direction, a neck portion 25 extending from the center in the lateral direction of the body portion 24 to the outer side in the radial direction, and a substantially triangle-shaped ear portion 26 connected to an outer end in the radial direction of the neck portion 25. In addition, in the metal elements 23, a pair of ring slots 27 into which the metal rings 22 are fitted are formed between the body portion 24 and the ear portion 26 and either side of the neck portion 25 so as to be open to an outer side in the lateral direction. Furthermore, saddle surfaces 28 in which inner circumferential surfaces of the metal rings 22 are seated are formed at the outer end in the radial direction of the body portion 24 so as to be located close to the ring slots 27, while an inclined surface 30 is formed on a front surface of the body portion 24 connecting to an inner side in the radial direction of the saddle surfaces 28 via a rocking edge 29 extending in the lateral direction.

The inclined surface 30 has its inner side in the radial direction inclined rearward, whereby the plate thickness in the longitudinal direction of the body portion 24 becomes smaller toward the inner side in the radial direction within a range of the inclined surface 30. The body portion 24, the neck portion 25, and the ear portion 26, all of which are located on the outer side in the radial direction of the rocking edge 29 of the metal elements 23, have a substantially constant plate thickness in the longitudinal direction. The metal elements 23 adjacent to one another in the longitudinal direction come into contact with one another at portions corresponding to the constant plate thickness. Any two adjacent ones of the metal elements 23 are in contact with each other in such a manner that the succeeding one is rockable or swingable about the rocking edge 29 against the rear surface of the preceding one, whereby the metal belt 15 can be wound around the drive pulley 13 and the driven pulley 14.

The body portion 24 of any one of the metal elements 23 has pulley contact surfaces 31 at both ends thereof that come into contact with V-shaped surfaces of the drive pulley 13 and the driven pulley 14. Also, the ear portion 26 of any one of the metal elements 23 has a projection 32 formed in a front surface thereof that is fitted into a recess (not illustrated) formed in a rear surface of the ear portion 26 of the preceding one of the metal elements 23.

Each of the metal elements 23 that have undergone press forming has an excess portion 33 extending from an inner end in the radial direction of the inclined surface 30 of the body portion 24. Such an excess portion 33 is cut away in a final finishing process (see FIG. 3).

Figure 4:
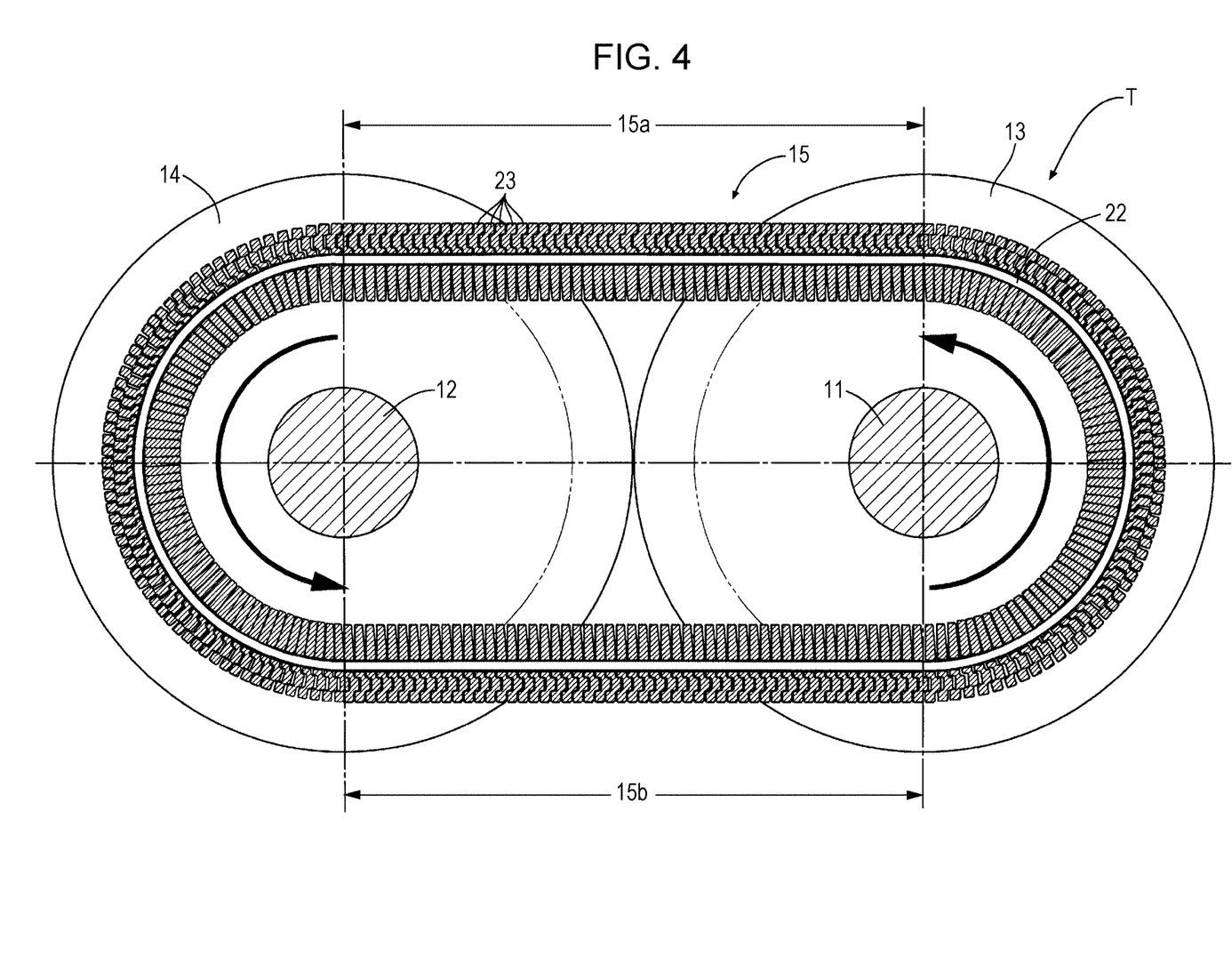
FIG. 4 is a diagram showing a state in which a metal belt is wound around a drive pulley and a driven pulley (according to the embodiment).

As shown in FIG. 4, the metal belt 15 wound around the drive pulley 13 and the driven pulley 14 that are rotated in a direction indicated by an arrow has a drive-side chord portion 15a and a return-side chord portion 15b, both of which extend linearly between the drive pulley 13 and the driven pulley 14. In the drive-side chord portion 15a, the adjacent metal elements 23 are in contact with one another, producing a pushing force to transmit driving power from the drive pulley 13 to the driven pulley 14.

The metal elements 23 that are adjacent to one another in the longitudinal direction in the drive-side chord portion 15a are in contact with one another at the body portion 24, the neck portion 25, and the ear portion 26 on the outer side in the radial direction of the rocking edge 29 having a substantially constant plate thickness in the longitudinal direction. However, in the conventional metal elements 23, the body portion 24 on the outer side in the radial direction of the rocking edge 29 has a slightly smaller plate thickness than the ear portion 26. As a result, an accumulated amount of the differences in plate thickness causes the drive-side chord portion 15a to be deflected toward the outer side in the radial direction, posing a problem of degraded efficiency in transmitting the driving power.

Described below is the reason why the body portion 24 on the outer side in the radial direction of the rocking edge 29 has a smaller plate thickness than the ear portion 26 in the conventional metal element 23.

Figures 5A, 5B:
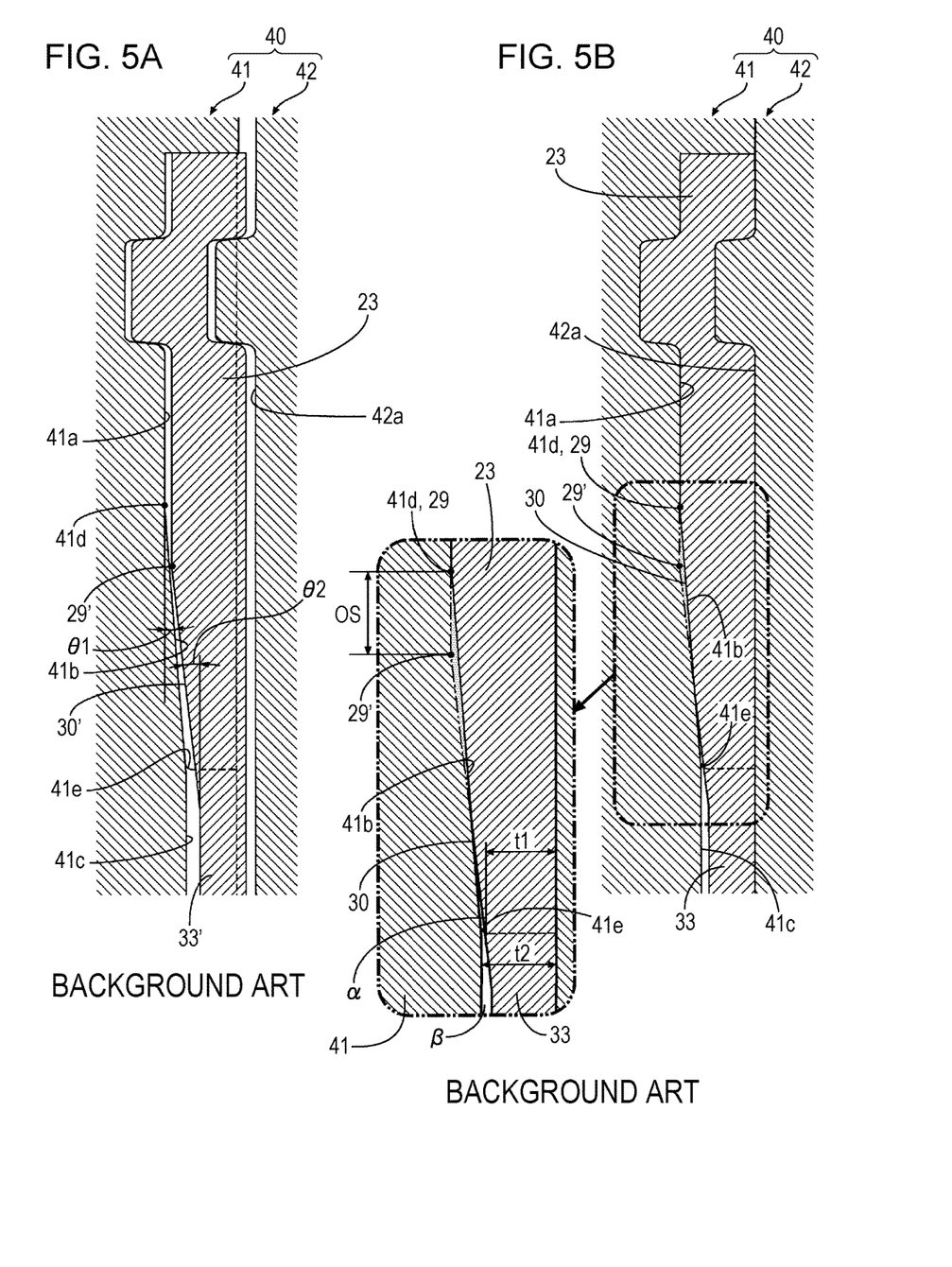
FIGS. 5A and 5B are diagrams showing a shape of a metal mold and a metal element material (as a conventional example).

FIGS. 5A and 5B show a conventional example. A metal mold 40 used to subject a roughly formed metal element material 23', which is an intermediate product of the metal element 23, to press and finish forming into the metal element 23 has a counter punch (a first metal mold) 41 that forms a front surface of the metal element 23 and a main punch (a second metal mold) 42 that forms a rear surface of the metal element 23. A molding surface 42a of the main punch 42 is basically flat, while a molding surface of the counter punch 41 has a flat first molding surface 41a that forms a portion on the outer side in the radial direction of the rocking edge 29, a flat second molding surface 41b that forms the inclined surface 30 on the inner side in the radial direction of the rocking edge 29, and a flat third molding surface 41c that forms the excess portion 33. Also, a rocking edge molding portion 41d extending in the lateral direction is formed on the boundary between the first molding surface 41a and the second molding surface 41b.

The metal element material 23' has a rocking edge corresponding portion 29' corresponding to the rocking edge 29 of the metal element 23, an inclined surface corresponding portion 30' corresponding to the inclined surface 30 of the metal element 23, and an excess portion corresponding portion 33' corresponding to the excess portion 33 of the metal element 23. The rocking edge corresponding portion 29' of the metal element material 23' is offset by an offset OS to the inner side in the radial direction in relation to the rocking edge molding portion 41d of the counter punch 41.

The molding surface 42a of the main punch 42, the first molding surface 41a and the third molding surface 41c of the counter punch 41 are parallel to one another in the radial direction. The second molding surface 41b of the counter punch 41 is inclined at an inclination angle of θ1 from the radial direction. The inclined surface corresponding portion 30' of the metal element material 23' is also inclined at an inclination angle of θ2 from the radial direction, but the inclination angle θ2 of the inclined surface corresponding portion 30' is configured to be larger than the inclination angle θ1 of the second molding surface 41b of the counter punch 41.

When the metal element material 23' is subjected to press forming using the metal mold 40, the action of the offset OS causes a material of the inclined surface corresponding portion 30' of the metal element material 23' to run toward the outer side in the radial direction, thereby trying to prevent a decrease in the plate thickness of the body portion 24 on the outer side in the radial direction of the rocking edge 29. However, a gap a between an inner end in the radial direction of the inclined surface 30 and the second molding surface 41b remains after the press forming, causing the material of the inclined surface corresponding portion 30' of the metal element material 23' to run toward the inner side in the radial direction. As a result, the body portion 24 on the outer side in the radial direction of the rocking edge 29 tends to have a smaller plate thickness than the ear portion 26.

Figure 6:
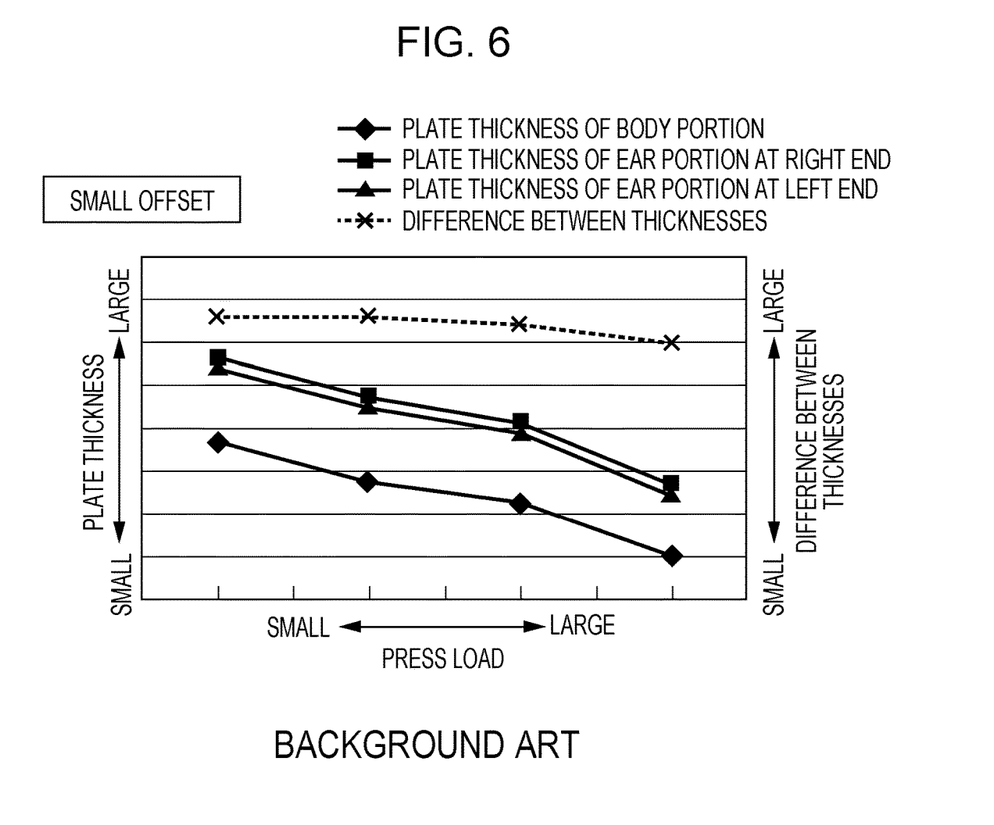
FIG. 6 is a graph showing changes in differences between plate thicknesses which vary with press load (as a conventional example).

FIG. 6 shows how a plate thickness (body portion plate thickness) of the body portion 24 at the center of the body portion 24 in the lateral direction on the outer side in the radial direction of the rocking edge 29, plate thicknesses (right and left ear portion plate thicknesses) of the ear portion 26 at the right and left ends of the ear portion 26, and a difference between the body portion plate thickness and the average of the right and left ear portion plate thicknesses change in accordance with press load. As clearly shown in the figure, the difference between the body portion plate thickness and the average of the right and left ear portion plate thicknesses remains large, regardless of whether the levels of press load are large or small.

Figures 7A, 7B:
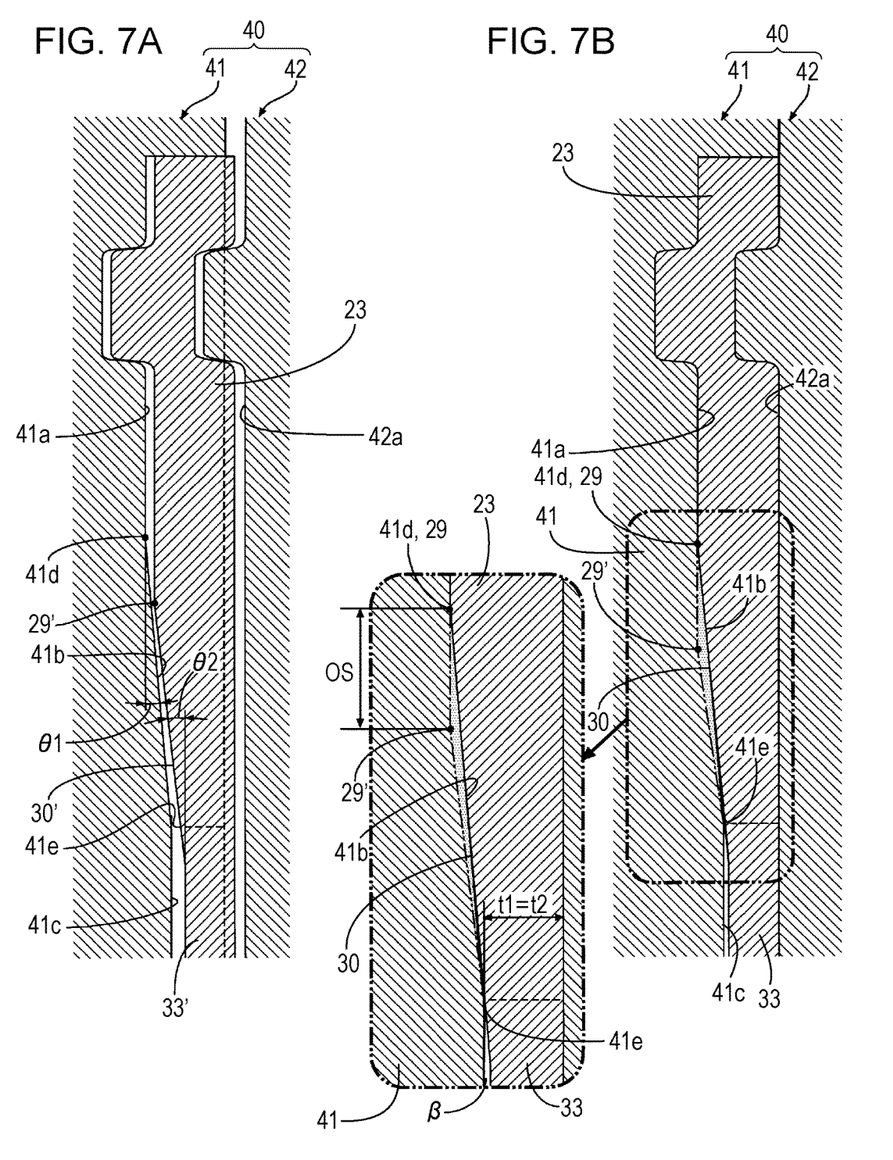
FIGS. 7A and 7B are diagrams showing a shape of a metal mold and a metal element material (according to the embodiment).

Compared with the conventional example shown in FIGS. 5A and 5B, the metal element material 23' according to the embodiment shown in FIGS. 7A and 7B has the rocking edge corresponding portion 29' shifted toward the inner side in the radial direction, resulting in the rocking edge corresponding portion 29' being shifted, in relation to the rocking edge molding portion 41d of the counter punch 41, toward the inner side in the radial direction by the offset OS that is larger by a predetermined level than that in the conventional example.

With this arrangement, the increased offset OS results in an increase in the amount of crush (see shaded area in FIG. 7B) close to the inclined surface corresponding portion 30' of the metal element material 23' during the press forming, thereby eliminating the generation of the gap a (see FIG. 5B) between the second molding surface 41b of the counter punch 41 and the inclined surface 30 of the metal element 23 when the press forming is completed. As a result, the material of the inclined surface corresponding portion 30' of the metal element material 23' is prevented from running toward the inner side in the radial direction, suppressing the tendency of the body portion 24 on the outer side in the radial direction of the rocking edge 29 to become thinner than the ear portion 26. This enables the plate thicknesses of the body portion 24, the neck portion 25, and the ear portion 26 on the outer side in the radial direction of the rocking edge 29 of the metal element 23 to be equal.

As described above, in a conventional example shown in FIGS. 5A and 5B, the plate thickness t1 in the longitudinal direction of the metal element 23 at the inner end in the radial direction of the inclined surface 30 is larger by the size of gap α than the distance t2 in the longitudinal direction between the counter punch 41 and the main punch 42 at the inner end in the radial direction of the inclined surface 30.

On the contrary, in the embodiment shown in FIGS. 7A and 7B, due to no generation of the gap α associated with the press forming, the distance t2 in the longitudinal direction between the counter punch 41 and the main punch 42 becomes equal to the plate thickness t1 in the longitudinal direction of the metal element 23 at the inner end in the radial direction of the inclined surface 30. After the metal element 23 removed from the metal mold 40, the metal element 23 becomes slightly thicker due to spring back caused by residual elasticity, resulting in the final plate thickness t1 in the longitudinal direction of the metal element 23 being slightly more than the distance t2 in the longitudinal direction between the counter punch 41 and the main punch 42.

Figure 8:
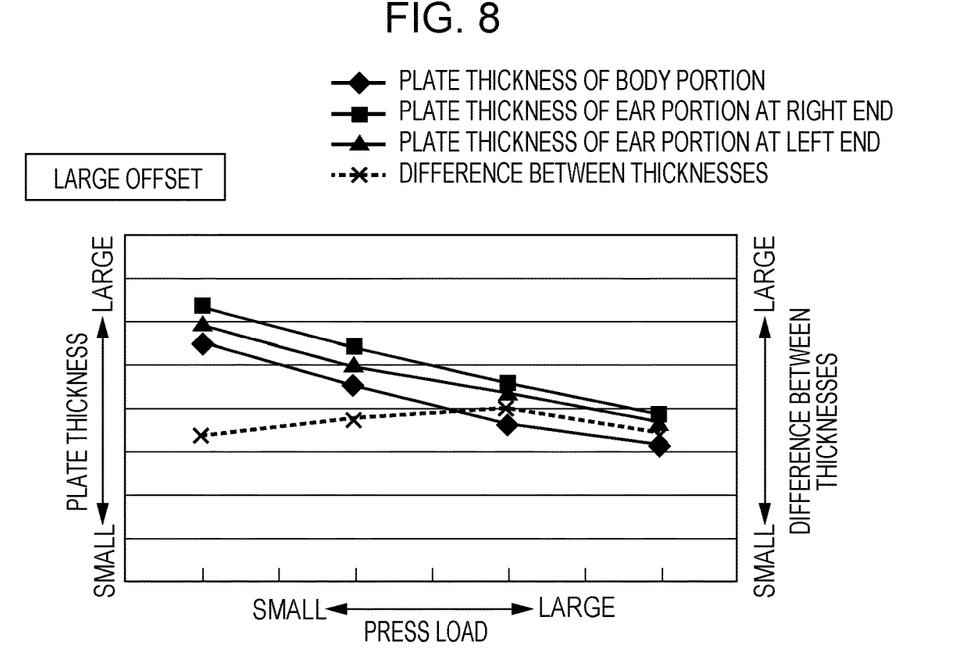
FIG. 8 is a graph showing changes in differences between plate thicknesses which vary with a press load (according to the embodiment).

FIG. 8 shows how the body portion plate thickness, the right and left ear portion plate thicknesses, and the difference between the body portion plate thickness and the average of the right and left ear portion plate thicknesses change in accordance with press load in the embodiment in which the offset OS is increased by a predetermined level compared with that in a conventional example. As clearly shown in the figure, in the embodiment, the difference between plate thicknesses of the metal element 23 can be significantly reduced regardless of the magnitude of the press load compared with a conventional example shown in FIG. 6.

Figure 9A:
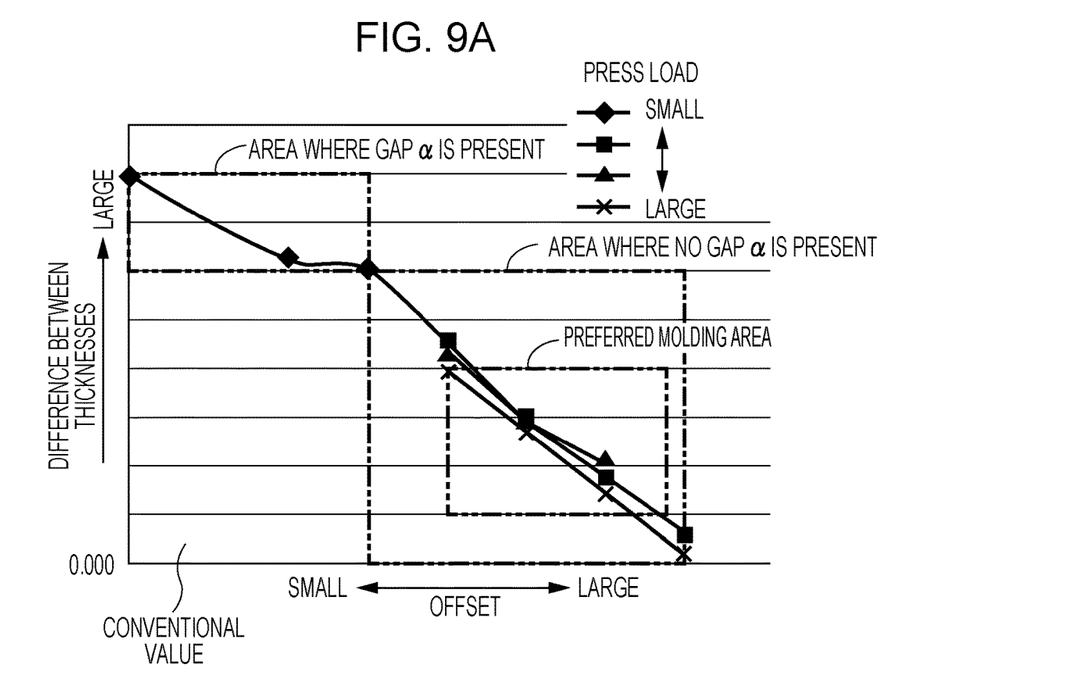
FIGS. 9A and 9B are graphs showing changes in differences between plate thicknesses which vary with a press load and an offset (according to the embodiment).
Figure 9B:
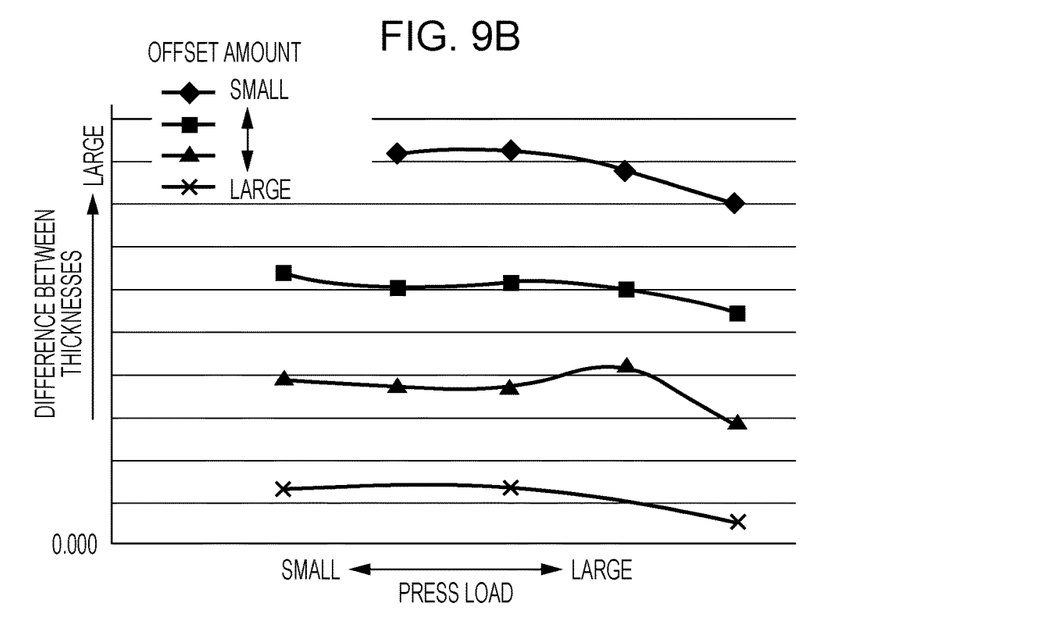

FIGS. 9A and 9B show how the difference between the body portion plate thickness and the average of the right and left ear portion plate thicknesses change in accordance with the offset OS and press load. These figures clearly show that, in the embodiment, the offset OS that is increased by a predetermined level compared with that in a conventional example can reduce the difference between the body portion plate thickness and the average of the right and left ear portion plate thicknesses regardless of the magnitude of the press load and that the difference between plate thicknesses is decreased as the offset OS increases.

When the metal belt 15 is wound around the drive pulley 13 and the driven pulley 14, a closer look at the metal element 23 whose right and left pulley contact surfaces 31, 31 are placed under pressure on the V-shaped surfaces of the drive pulley 13 and the driven pulley 14 reveals that the center in the lateral direction is deflected in the shape of a circular arc so as to project toward the outer side in the radial direction, posing the problem of degraded efficiency during transmission of driving power. The tendency of the metal element 23 to be deflected becomes noticeable when there is a large difference between plate thicknesses of the body portion 24 of the metal element 23 subjected to press forming at the outer side in the radial direction (close to the saddle surfaces 28, 28) and the body portion 24 at the inner side in the radial direction (close to the rocking edge 29). Even if there is no difference between plate thicknesses, the tendency becomes more noticeable when the rocking edge 29 is located closer to the saddle surfaces 28, 28.

Accordingly, in the case of the metal element 23 in which the rocking edge 29 is located close to the saddle surfaces 28, 28, it is important to control the plate thickness of the metal element 23 in order to prevent the curvature of the metal element 23 and thereby ensure the efficiency in transmitting the driving power.

As shown in FIGS. 7A and 7B, when the metal element 23 is subjected to press forming, a gap β is produced between the excess portion 33 of the metal element 23 and the third molding surface 41c of the counter punch 41. Since the gap α (see FIGS. 5A and 5B) that is found in a conventional example is not generated between the inclined surface 30 of the metal element 23 and the second molding surface 41b of the counter punch 41, the counter punch 41 that forms an inner end in the radial direction of the inclined surface 30 is likely to sustain damage at a corner 41e thereof from a large load when the metal mold 40 is used for an extended period of time. However, part of the material of the inclined surface 30 is allowed to run into the gap β, thereby preventing an excessive load from being exerted on the corner 41e of the counter punch 41 which improves the durability of the metal mold 40.

The excess portion 33 connected to the body portion 24 of the metal element 23 is finally cut away from the body portion 24.

The present application is typically described with reference to, but not limited to, the foregoing embodiments. Various modifications are conceivable within the scope of the present application.

For example, although the offset OS according to the present application is preferably larger by an increment of approximately 0.6 mm than the offset OS used in a conventional example, such an increment may vary with the size of the metal element 23. Accordingly, as the metal element 23 becomes larger in size, the increment increases to a higher level.

A first aspect of the present application provides a continuously variable transmission metal element formed by subjecting a roughly formed metal element material to press and finish forming using a metal mold, including a pair of ring slots into which a pair of metal rings are fitted, a neck portion located between the pair of ring slots, an ear portion connecting to an outer side in a radial direction of the neck portion, and a body portion that connects to an inner side in the radial direction of the neck portion and has saddle surfaces supporting circumferential surfaces of the metal rings and also has an inclined surface formed on a front face thereof via a rocking edge extending in a lateral direction, the inclined surface having its inner side in the radial direction inclined rearward, in which a plate thickness in a longitudinal direction of the metal element subjected to the finish forming at an inner end in the radial direction of the inclined surface is larger than a clearance in the longitudinal direction of a molding surface of the metal mold corresponding to the inner end in the radial direction of the inclined surface. With this arrangement, the material of the metal element, when subjected to press forming using the metal mold, is prevented from running toward the inner side in the radial direction of the inclined surface, thereby preventing the body portion close to the rocking edge from becoming thinner than the ear portion. This enables the plate thicknesses of the metal element at various portions to be equal.

A second aspect of the present application provides a continuously variable transmission metal element of the first aspect, in which a rocking edge molding portion of the metal mold may be located on the outer side in the radial direction of a rocking edge corresponding portion of the metal element material. With this arrangement, when subjected to finish forming using the metal mold, the material of the body portion of the metal element is allowed to run toward the outer side in the radial direction, thereby ensuring that a reduction in the plate thickness of the body portion close to the rocking edge is further prevented.

A third aspect of the present application provides a continuously variable transmission metal element of the first or second aspect, in which the metal element may have an excess portion projecting from the inner end in the radial direction of the inclined surface, the excess portion being cut off after the finish forming, and, after the finish forming, a gap may be present between the molding surface of the metal mold and the excess portion. With this arrangement, an excess material produced at the inner end in the radial direction of the inclined surface of the metal element during the finish forming is allowed to run into the gap, thereby preventing degraded durability of the metal mold resulting from excessive levels of molding pressure.

Obviously, numerous modifications and variations of the present invention are possible in light of the above teachings. It is therefore to be understood that within the scope of the appended claims, the invention may be practiced otherwise than as specifically described herein.

What is claimed is:

1. A continuously variable transmission metal element formed by subjecting a roughly formed metal element material to press and finish forming using a metal mold, the metal element comprising:
    a pair of ring slots into which a pair of metal rings are fitted;
    a neck portion located between the pair of ring slots;
    an ear portion connecting to an outer side in a radial direction of the neck portion; and
    a body portion that connects to an inner side in the radial direction of the neck portion and has saddle surfaces supporting circumferential surfaces of the metal rings and has an inclined surface on a front face thereof via a rocking edge extending in a lateral direction, the inclined surface having its inner side in the radial direction inclined rearward,
    wherein a plate thickness in a longitudinal direction of the metal element subjected to the finish forming at an inner end in the radial direction of the inclined surface is larger than a clearance in the longitudinal direction of a molding surface of the metal mold corresponding to the inner end in the radial direction of the inclined surface.

2. The continuously variable transmission metal element according to claim 1,
    wherein a rocking edge molding portion of the metal mold is located on the outer side in the radial direction of a rocking edge corresponding portion of the metal element material.

3. The continuously variable transmission metal element according to claim 1,
    wherein the metal element has an excess portion projecting from the inner end in the radial direction of the inclined surface, the excess portion being cut off after the finish forming, and, after the finish forming, a gap (β) is present between the molding surface of the metal mold and the excess portion.

4. A continuously variable transmission metal element comprising:
    a first ring slot into which a first metal ring is to be fitted;
    a second ring slot into which a second metal ring is to be fitted;
    a neck portion located between the first ring slot and the second ring slot;
    an ear portion connected to an outer side of the neck portion in a radial direction; and
    a body portion connected to an inner side of the neck portion in the radial direction and comprising:
        a first saddle surface to support a circumferential surface of the first metal ring;
        a second saddle surface to support a circumferential surface of the second metal ring;
        a rocking edge extending in a lateral direction perpendicular to the radial direction; and an inclined surface provided on a front face of the body portion and inclined rearward in a longitudinal direction perpendicular to the lateral direction from the rocking edge toward an inner side of the body portion in the radial direction, a plate thickness of the continuously variable transmission metal element in the longitudinal direction at an inner end of the inclined surface in the radial direction being larger than a distance between a first metal mold molding surface of a first metal mold and a second metal mold molding surface of a second metal mold in the longitudinal direction at a position corresponding to the inner end of the inclined surface, the first metal mold and the second metal mold constituting a metal mold to press a roughly formed metal element material between the first metal mold molding surface and the second metal mold molding surface so as to provide the continuously variable transmission metal element.

5. The continuously variable transmission metal element according to claim 4, wherein the metal mold includes a rocking edge molding portion to provide the rocking edge on the roughly formed metal element material, and wherein the rocking edge molding portion is located on an outer side of a rocking edge corresponding portion of the roughly formed metal element material in the radial direction.

6. The continuously variable transmission metal element according to claim 4, further comprising:

an excess portion projecting from the inner end of the inclined surface and having an excess portion surface to face the first metal mold molding surface, wherein in a state where the roughly formed metal element material is pressed between the first metal mold molding surface and the second metal mold molding surface so as to provide the continuously variable transmission metal element, a gap is formed between the first metal mold molding surface and the excess portion surface of the excess portion.

7. The continuously variable transmission metal element according to claim 4, wherein the distance is a distance between the first metal mold molding surface and the second metal mold molding surface in the longitudinal direction at the position corresponding to the inner end of the inclined surface in a state where the roughly formed metal element material is pressed between the first metal mold molding surface and the second metal mold molding surface so as to provide the continuously variable transmission metal element.

* * * * *